US007343219B2

(12) United States Patent
Berdelle-Hilge

(10) Patent No.: US 7,343,219 B2
(45) Date of Patent: Mar. 11, 2008

(54) DEVICE USED TO ORGANISE FLAT PACKETS ACCORDING TO A DETERMINED SEQUENCE

(75) Inventor: Peter Berdelle-Hilge, Constance (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/570,993

(22) PCT Filed: Sep. 7, 2004

(86) PCT No.: PCT/EP2004/009959

§ 371 (c)(1), (2), (4) Date: Mar. 8, 2006

(87) PCT Pub. No.: WO2005/025764

PCT Pub. Date: Mar. 24, 2005

(65) Prior Publication Data

US 2006/0259185 A1 Nov. 16, 2006

(30) Foreign Application Priority Data

Sep. 15, 2003 (DE) ................................ 103 42 463

(51) Int. Cl.
*G06F 7/00* (2006.01)
*B07C 5/00* (2006.01)
*G06K 9/00* (2006.01)

(52) U.S. Cl. ...................... 700/223; 209/584; 700/213; 700/230

(58) Field of Classification Search ................ 700/223, 700/219, 213, 228, 230; 209/900, 584, 911; 198/704, 703

See application file for complete search history.

(56) References Cited

U.S. PATENT DOCUMENTS

| | | | | |
|---|---|---|---|---|
| 3,300,066 A | | 1/1967 | Henig et al. | |
| 3,573,748 A | | 4/1971 | Holme | |
| 4,509,635 A | * | 4/1985 | Emsley et al. | 198/370.03 |
| 5,143,225 A | * | 9/1992 | Rabindran et al. | 209/584 |
| 5,363,971 A | * | 11/1994 | Weeks et al. | 209/584 |
| 5,433,325 A | * | 7/1995 | Levaro et al. | 209/584 |
| 5,462,268 A | | 10/1995 | Remy et al. | |
| 5,535,874 A | * | 7/1996 | Ross et al. | 198/477.1 |
| 5,718,321 A | * | 2/1998 | Brugger et al. | 198/359 |
| 5,994,657 A | * | 11/1999 | Maier et al. | 209/584 |

(Continued)

FOREIGN PATENT DOCUMENTS

DE 197 14 185 7/1998

(Continued)

*Primary Examiner*—Gene O. Crawford
*Assistant Examiner*—Ramya G. Prakasam

(57) ABSTRACT

A device used to arrange flat packets according to a determined sequence of delivery points associated with receiver addresses, whereby below a continuous part of a surrounding pocket ring designated as a covering area, one part of a collector belt, which is displaced with relative speed, is arranged on a stacking device to receive packets from the pockets in order to further transport the packets. The transportation speed of the collector belt is synchronised with the transportation speed of the pocket ring such that each section of the collector belt passes along the covering area of each pocket of the pocket ring at least once during the movement thereof. The packets are emptied onto the collector belt from the pockets of the pocket ring according to the read recipient addresses such that they leave the collector belt in the stacking device in a determined sequence of the recipient addresses.

17 Claims, 6 Drawing Sheets

U.S. PATENT DOCUMENTS

| | | | | |
|---|---|---|---|---|
| 6,095,315 | A * | 8/2000 | Andersch et al. | 198/370.05 |
| 6,394,449 | B1 * | 5/2002 | Reist | 271/204 |
| 6,523,675 | B1 * | 2/2003 | Romeder | 198/704 |
| 2002/0125177 | A1 * | 9/2002 | Burns et al. | 209/630 |
| 2003/0038065 | A1 * | 2/2003 | Pippin et al. | 209/584 |

FOREIGN PATENT DOCUMENTS

| | | |
|---|---|---|
| DE | 199 43 362 | 3/2001 |
| EP | 0 820 818 | 1/1998 |
| WO | WO 02/00362 | 1/2002 |
| WO | WO 2004/067193 | 8/2004 |
| WO | WO 2004/071680 | 8/2004 |

* cited by examiner

DEVICE USED TO ORGANISE FLAT PACKETS ACCORDING TO A DETERMINED SEQUENCE

The invention relates to a device for organizing flat mail items according to a definable sequence of delivery points associated with the recipients' addresses, having at least one separating unit, each having a downstream reader unit for identifying the address information located on the mail items, and having a circulating pocket ring, in each of the controllably emptiable pockets thereof a read mail item is conveyed.

A solution for organizing into a specified sequence was disclosed in EP 820 818 A1, said solution using a temporary storage device consisting of pockets or similar components, each of which can receive a mail item and deliver it into the actual tray when instructed to do so. Here all the mail items to be organized are initially accommodated in an arbitrary sequence in the pockets of the temporary storage device. The mail items are then removed from the pockets of the temporary storage device and transferred to the trays such that they are located in said trays in the order to be established. A separate receptacle is provided for each mail item. Sorting takes place with two cycles of the pockets of the temporary storage device: one cycle for filling the pockets and a further cycle for emptying the pockets.

For this purpose, however, a large number of trays are required, each having to be provided with a control mechanism to initiate transfer of the mail item from the correct pocket of the temporary storage device.

A corresponding solution where a plurality of mail items are destacked into the receptacles in an organized manner is also known. The delivery of the mail items from the containers into the receptacles takes place in a plurality of cycles, the sequence of the mail items in each receptacle corresponding to the sequence of the delivery points associated with the addresses of the mail items located in the particular receptacle (DE 199 43 362 A1).

U.S. Pat. No. 3,573,748 discloses a device where mail items are emptied from stationary pockets onto a collector belt subdivided into sections, and U.S. Pat. No. 5,462,268 A discloses a device where mail items are emptied from circulating pockets into containers and thus into sections of a conveyor.

The object of the invention is to provide a device for organizing flat mail items according to a definable sequence of delivery points associated with the recipients' addresses, where the mail items are organized into the defined sequence only once, having been separated and read, and by means of circulating pocket rings, the effort involved in removing the mail items being reduced and it being possible additionally to include other mail items or mail item flows.

According to the invention, the object is achieved by virtue of the features of claim 1.

Below a continuous portion of the pocket ring referred to as the overlap area, there is arranged a portion, traveling at relative speed thereto, of a carrying system having a collector belt for receiving the mail items from the pockets for onward carriage of the mail items to a stacking device. The carrying speed of the collector belt is matched to the carrying speed of the pocket ring such that, as each section of the collector belt travels along the overlap area, it passes each pocket of the pocket ring at least once, and the mail items are emptied out of the pockets of the pocket ring onto the collector belt according to the read recipients' addresses such that said items leave the collector belt in the stacking device in the defined sequence of the recipients' addresses.

The device thus has at least one exit point.

Advantageous embodiments of the invention are explained in the subclaims.

To isolate the loading process of the pockets in the pocket loading station from the loading of the collector belt, it is advantageous to arrange between this pocket ring and the carrying system having the collector belt a further pocket ring which circulates at a different carrying speed and/or in a different carrying direction from the upper pocket ring, and the pockets thereof receive mail items from the upper pocket ring and deliver them to the carrying system having the collector belt in the overlap area.

To ensure that the mail items are safely juxtaposed and lying on top of one another, it is advantageous to subdivide the collector belt into sections with crossbars.

To enable discontinuous incoming flows of mail items to be processed without a loss of sorting performance, advantageously there is arranged between the reader unit or units and the pocket ring a buffer storage unit for receiving the read mail items. In the pocket loading station, each of the read mail items is loadable into the buffer pockets which, at least at one exit point, deliver the mail items in a controlled manner to empty pockets of the sorting pocket ring and which, in a further advantageous embodiment, are connectable to a circulating endless conveyor means and are disconnectable from the conveyor means. At the time of transfer, the buffer pockets of the buffer storage unit are connected to the conveyor means, and the transferring buffer storage device travels positioned in the same direction at the same speed to the loading pocket.

It is also advantageous if the pocket ring and the collector belt circulate in opposite directions, so that the collector belt can be kept at a relatively slow speed.

To merge the mail items from the pocket ring with further mail items/mail item flows, devices for loading with further mail items; which are to be distributed to the appropriate recipients' addresses, onto the sections associated with the recipients' addresses are advantageously arranged over the portions of the collector belt disposed outside the overlap area.

To ensure that the mail items are routed onto the collector belt only up to the maximum height envisaged, sensors are provided for measuring the mail item thicknesses. If the overall height of the mail items assigned to one delivery point exceeds a limit value, the adjacent areas can also be loaded with mail items of the same delivery point as needed.

For optimal utilization of the collector belt, it is also possible for a plurality of mail items of different but adjacent delivery points to be loaded into a section of the collector belt. In this case, the mail items must be disposed in the sections of the collector belt on top of one another in the defined sequence of the delivery points.

To ensure that the overlap area is as large as possible relative to the base area, it is advantageous to arrange the collector belt in a U-shape below a portion of the pocket ring.

It is also advantageous if, outside the overlap area, the pocket ring and/or the buffer storage device has at least one loading and unloading station for additionally ejecting mail items from the pockets according to specified sorting criteria. It is thereby possible not only to sort but also to separate mail items according to specified criteria.

To keep the base area of the device as small as possible, it is advantageous to guide the portion of the pocket ring extending beyond the overlap area and not located below the unloading stations of the buffer storage device into an additional plane located above the plane of the buffer storage device or below the plane of the collector belt, the mail items circulating in the same direction in both planes.

Here it is especially advantageous if the height-overcoming deflection of the pocket ring is effected inside the buffer storage device.

In addition to a first device there is provided a second organizing device which, relative to the first device, is rotated 180° about the vertical axis, and with which the portion of the pocket ring not located over the collector belt is located in the other plane opposite the corresponding portion of the first organizing device. The two devices can thus be nestingly fitted together, thereby almost halving the base area required by comparison with a separate setup.

To save the deliverer manual work, it is advantageous to provide between the collector belt and the stacking device a portioning unit in which the matching mail items for a particular delivery point are packed into sacks or bags or are provided with bands prior to stacking.

The invention is explained in more detail below in an exemplary embodiment with reference to the drawing, in which.

Figure 1:
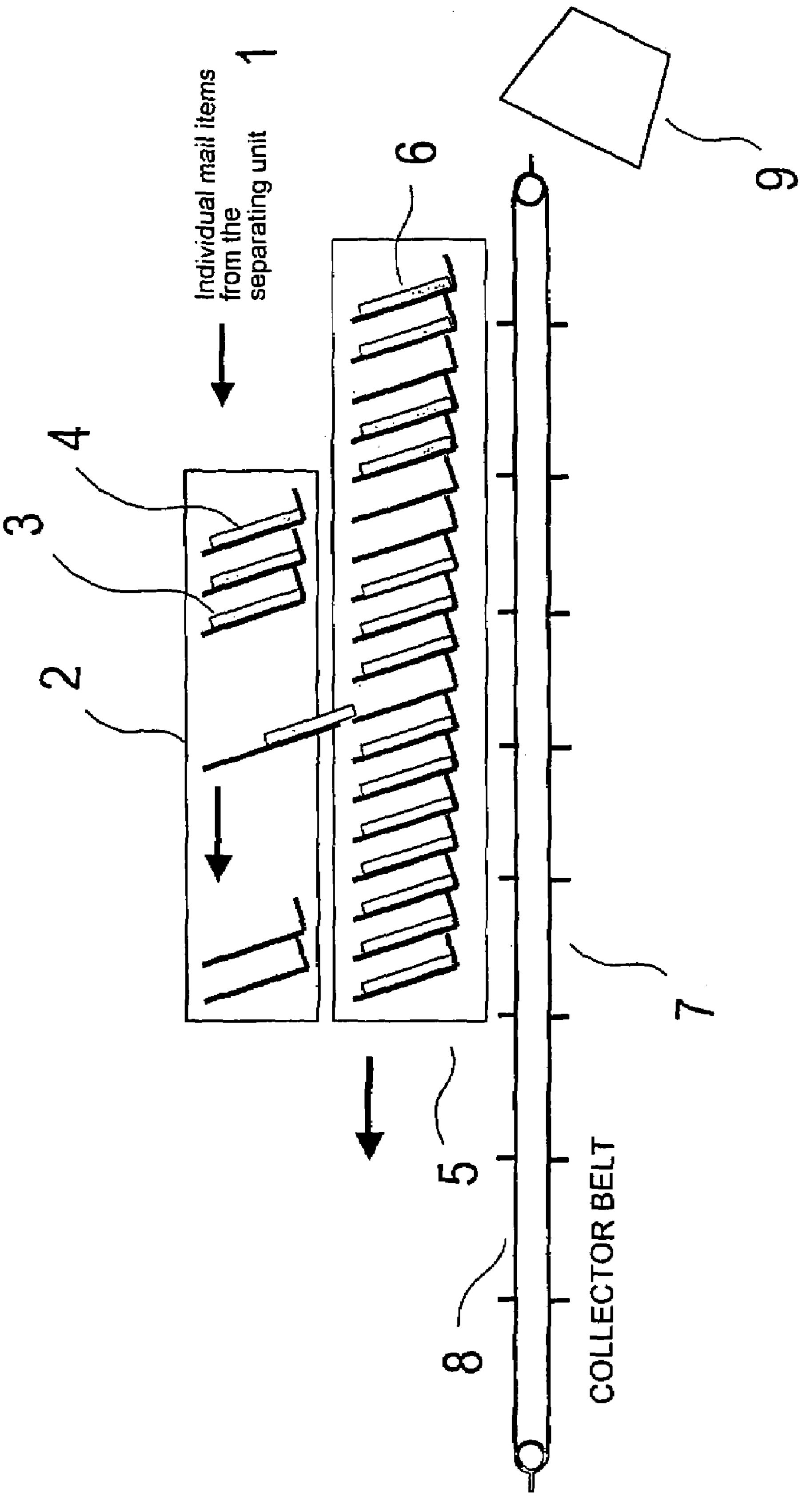
FIG. 1 is a diagrammatic side view of a device for organizing according to the distribution sequence with loading of the pocket ring.
Figure 2:
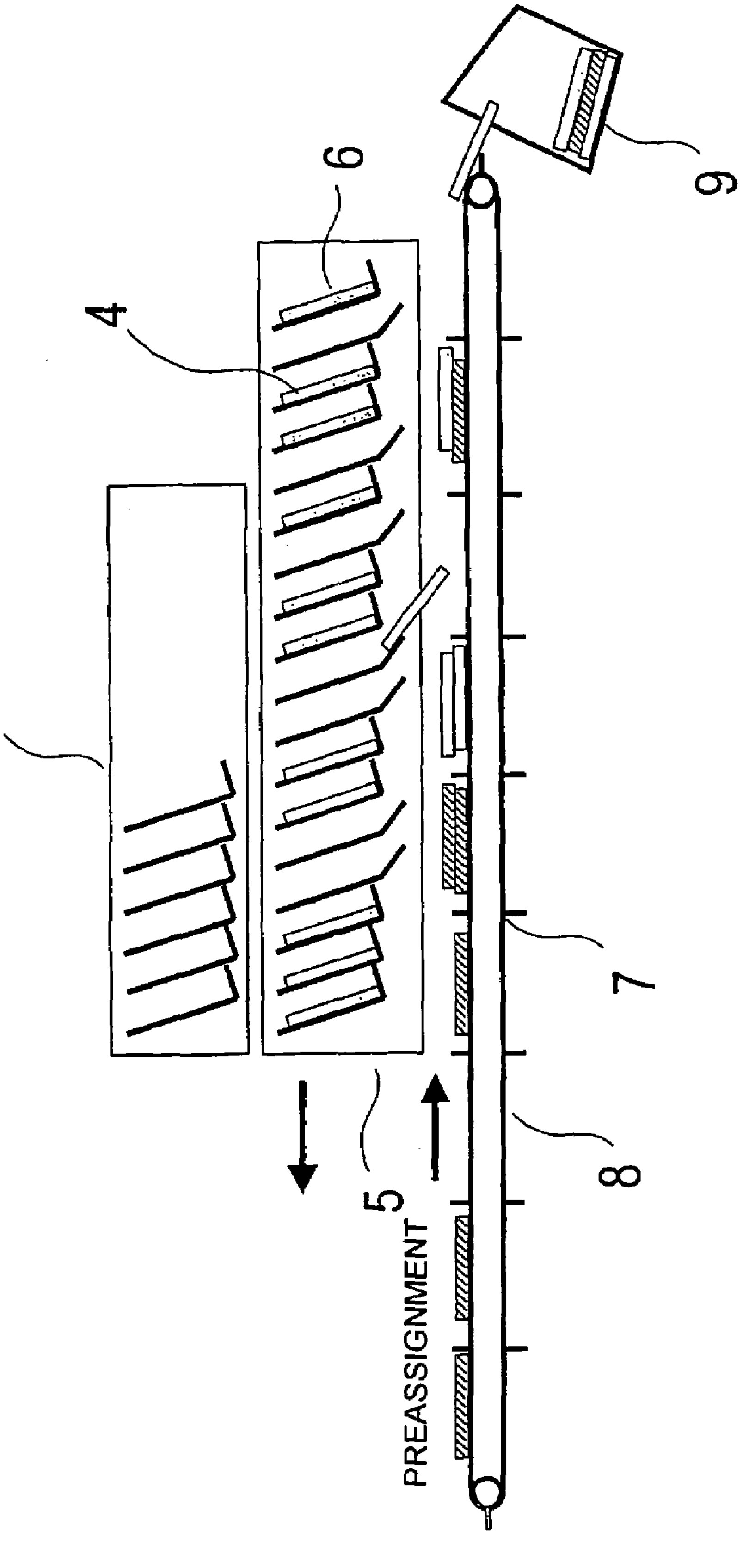
FIG. 2 is a diagrammatic side view of a device with loading of the collector belt subdivided into sections.
Figure 3:
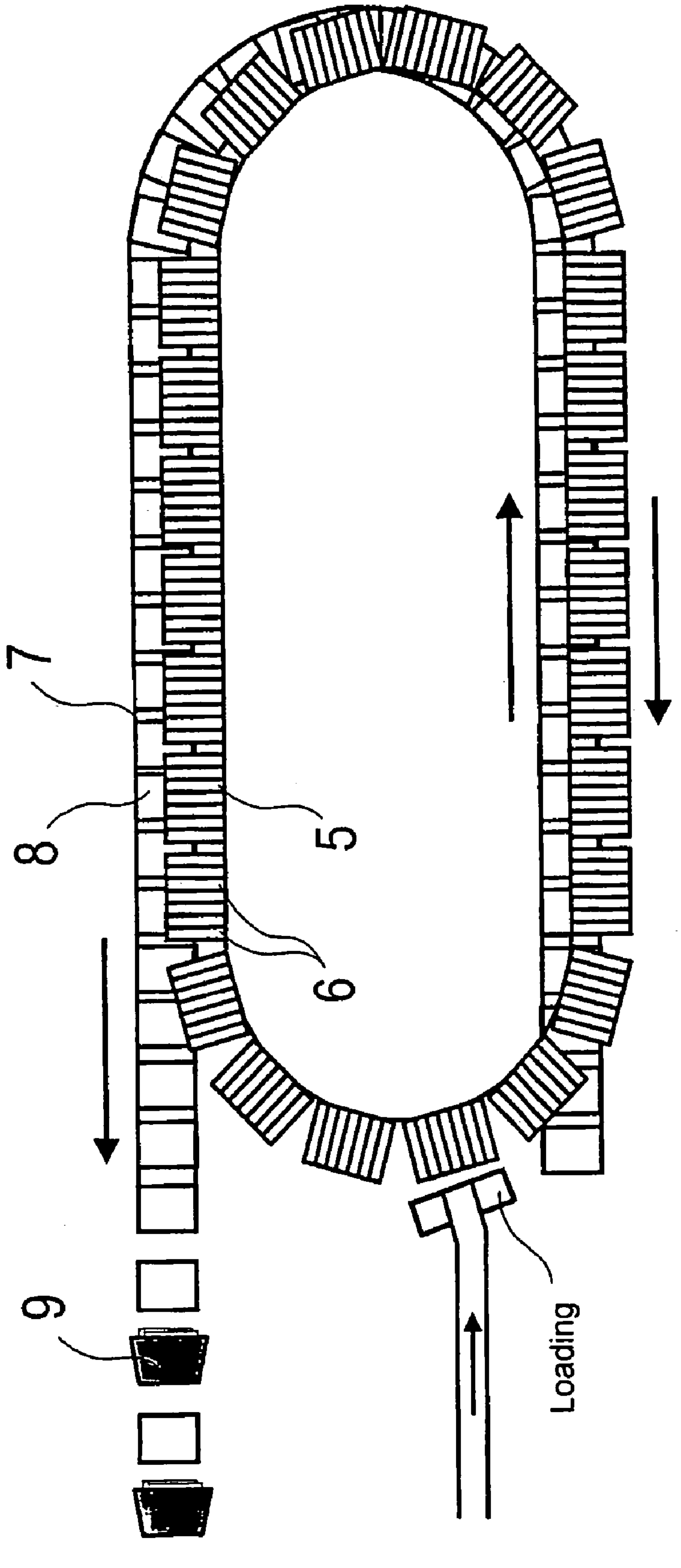
FIG. 3 is a diagrammatic plan view of an organizing device.

The mail items 4 are first separated from a stack in a known manner in a separating unit 1. Then in a reader unit (not shown) the recipients' addresses of the mail items 4 are detected and identified. The read mail items 4 are then routed to a buffer storage unit 2. There, each mail item 4 is conveyed via a loading station into a circulating buffer pocket 3, these buffer pockets 3 being connectable to a circulating conveyor means in a controlled manner and being disconnectable from the conveyor means in a controlled manner, and the transfer taking place in the connected state.

If a plurality of separating units 1 are provided for throughput reasons, the mail items 4 are carried from each separating unit 1 into the buffer pockets 3 via a separate loading station.

As a result of the buffer capability, it is possible to continue to process both a discontinuous inflow from the separating units 1 and an outflow that is not synchronous with the inflow and/or is discontinuous. The buffer pockets 3 can be downwardly opened in a controlled manner in order to deliver the mail items 4 to empty pockets 6 of a further pocket ring 5 circulating thereunder. In this case, the pockets 6 are fixedly connected to the circulating conveyor system.

The pocket ring 5 and the buffer pockets 3 circulate in the same direction.

The mail items 4 are organized according to the agreed sequence of the delivery points by the mail items 4 dropping downwards in a controlled manner, as a result of the opening of the pocket bases of the pockets 6, onto a collector belt 7 subdivided into sections with its top run circulating in the opposite direction to the pocket ring 5.

Here the collector belt 7 is arranged, in plan view, in a U shape under the pocket ring, that is to say, the pocket ring 5 is longer than the collector belt 7.

The carrying speeds are matched such that, as each section 8 of the collector belt 7 travels along the area of overlap with the pocket ring 5, it passes each pocket 6 of the pocket ring 5 once. A plurality of mail items 4 can be loaded in a section 8 up to a maximum overall height at which safe carriage and stacking performance (see below) are guaranteed.

The collector belt 7 can also have mail items preassigned to it by further sorting units or input units for all or specific recipients.

At the end of the collector belt 7 there is located a stacking device to stackingly receive the mail items 4 in the defined sequence into containers 9. Between the collector belt 7 and the stacking device there can also be arranged a portioning unit in which the matching mail items of a delivery point are packed into sacks and bags or are provided with bands prior to stacking. According to the position of the container 9, the mail items 4 can be stacked in the container 9 in a vertical or horizontal position. The mail items 4 are loaded onto the collector belt 7 such that they leave it in the appropriate sequence. If mail items 4 of different but adjacent delivery points are loaded into a section 8, they must be lying on top of one another in the defined sequence of the delivery points.

Figure 4:
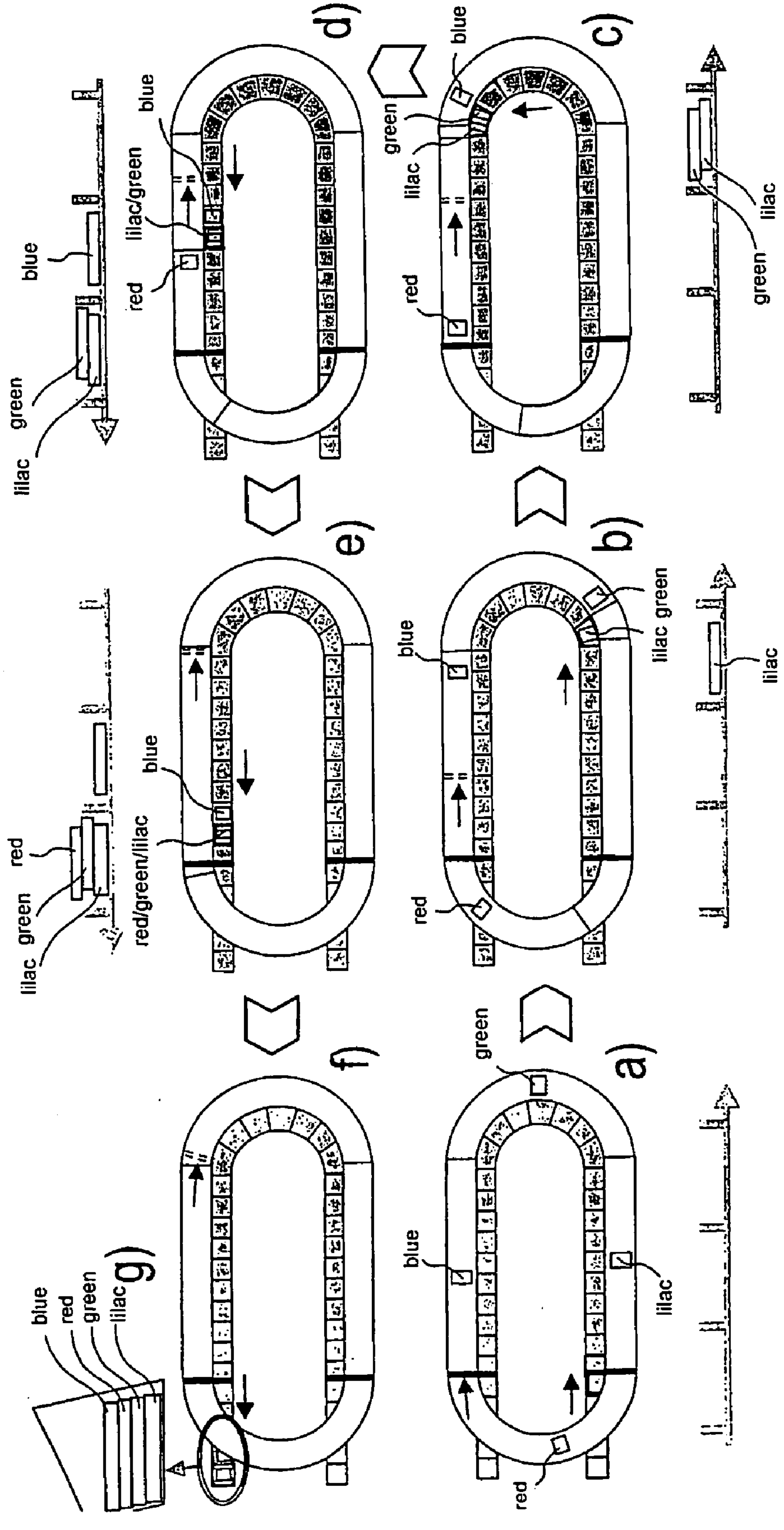
FIG. 4 is a diagrammatic view of the operating principle with reference to the diagrammatic plan view.

By way of explanation, the sequence is shown in FIG. 4 in a simple example.

The mail items 4 in the pocket ring 5 (FIG. 4*a*) are to be deposited in a container in descending order of the colors blue, red, green and lilac as in FIG. 4*g*. The pocket ring 5 and the collector belt 7 are traveling in opposite directions. First the mail item marked lilac is deposited into a section of the collector belt 7 (FIG. 4*b*). If the mail item 4 marked green is then located above this section, said item will be deposited onto the mail item lilac (FIG. 4*c*). The mail item 4 marked blue passes this section by, as it is the last mail item in the sequence, and is unloaded into the following section (FIG. 4*d*).

In FIG. 4*e*, the mail item red has reached the section with the two mail items lilac and green and is unloaded as the uppermost mail item. This was done on condition that the previously measured mail item thicknesses allow the three mail items to be deposited into one section. Then, in the stacking device, the mail items 4 are stacked into a container in the desired sequence (FIG. 4*f*).

The pocket ring 5 can pass through two planes so that the organizing device can be accommodated on the smallest possible base area.

The portion of the pocket ring 5 which does not overlap the collector belt 7 is foldable about a horizontal axis above or below the overlapping portion: the pocket ring 5 then essentially follows a horizontal figure of eight which has been folded at its point of intersection and is there encircled by the buffer storage unit 2. With constant synchronization between the pocket ring 5 and the collector belt 7, the actuators for opening the pockets 6 of the pocket ring 5 can be fixedly arranged.

Figure 5:
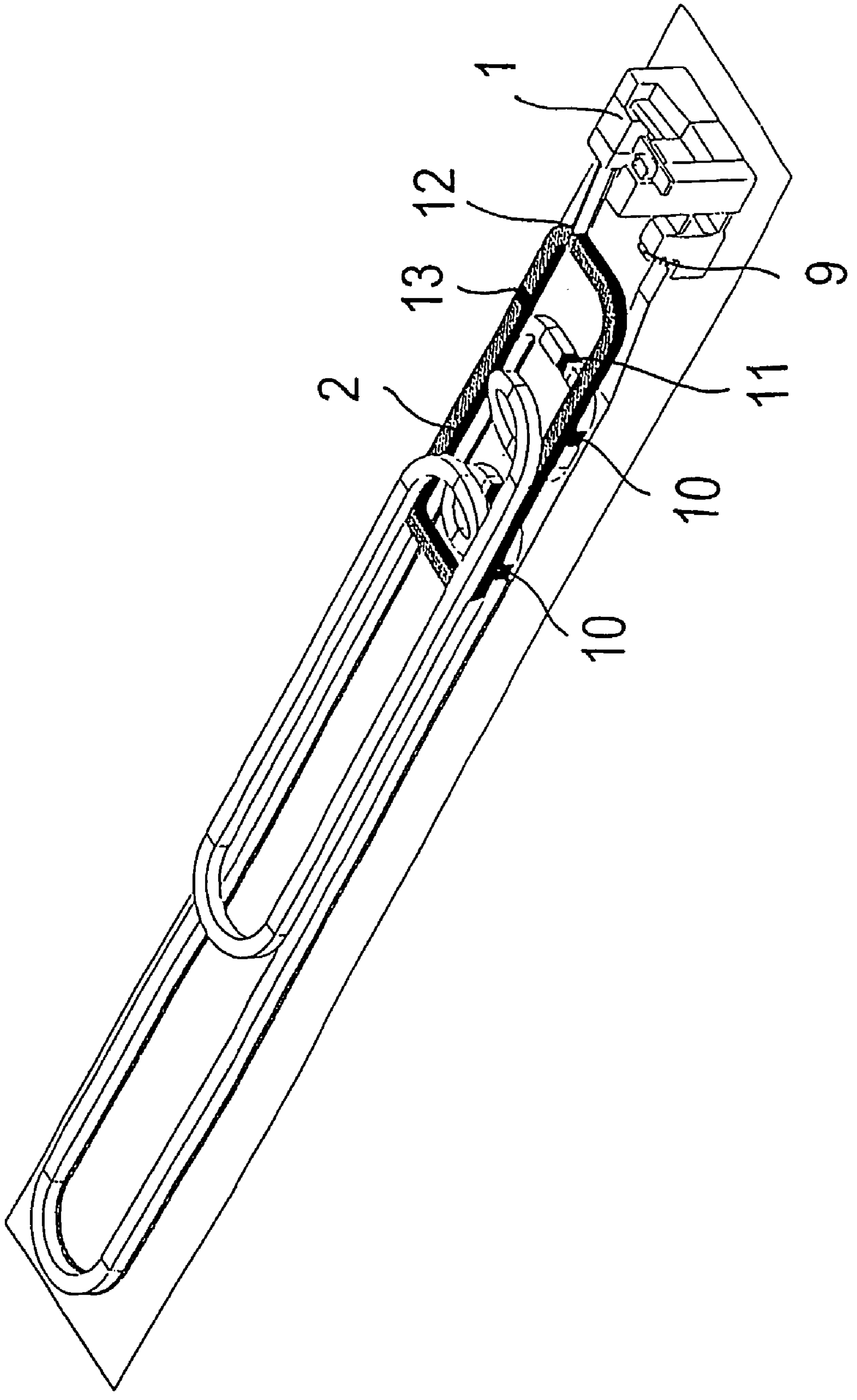
FIG. 5 is a perspective drawing of an organizing device having a plurality of planes.

To keep the system as compact as possible, according to FIG. 5 there is at the plane junction a 540° deflection over the interior of the system. Outside the overlap area it is possible to identify exit points 10 of the buffer storage unit 2 for loading the pockets 6, unloading stations 11 for additionally ejecting mail items 4 from the pockets 6 according to specified sorting criteria, a loading station 12 for loading the buffer pockets with the mail items from the separating unit 1, and an exit point 13 of the buffer storage unit 2 for ejecting separated mail items.

Figure 6:
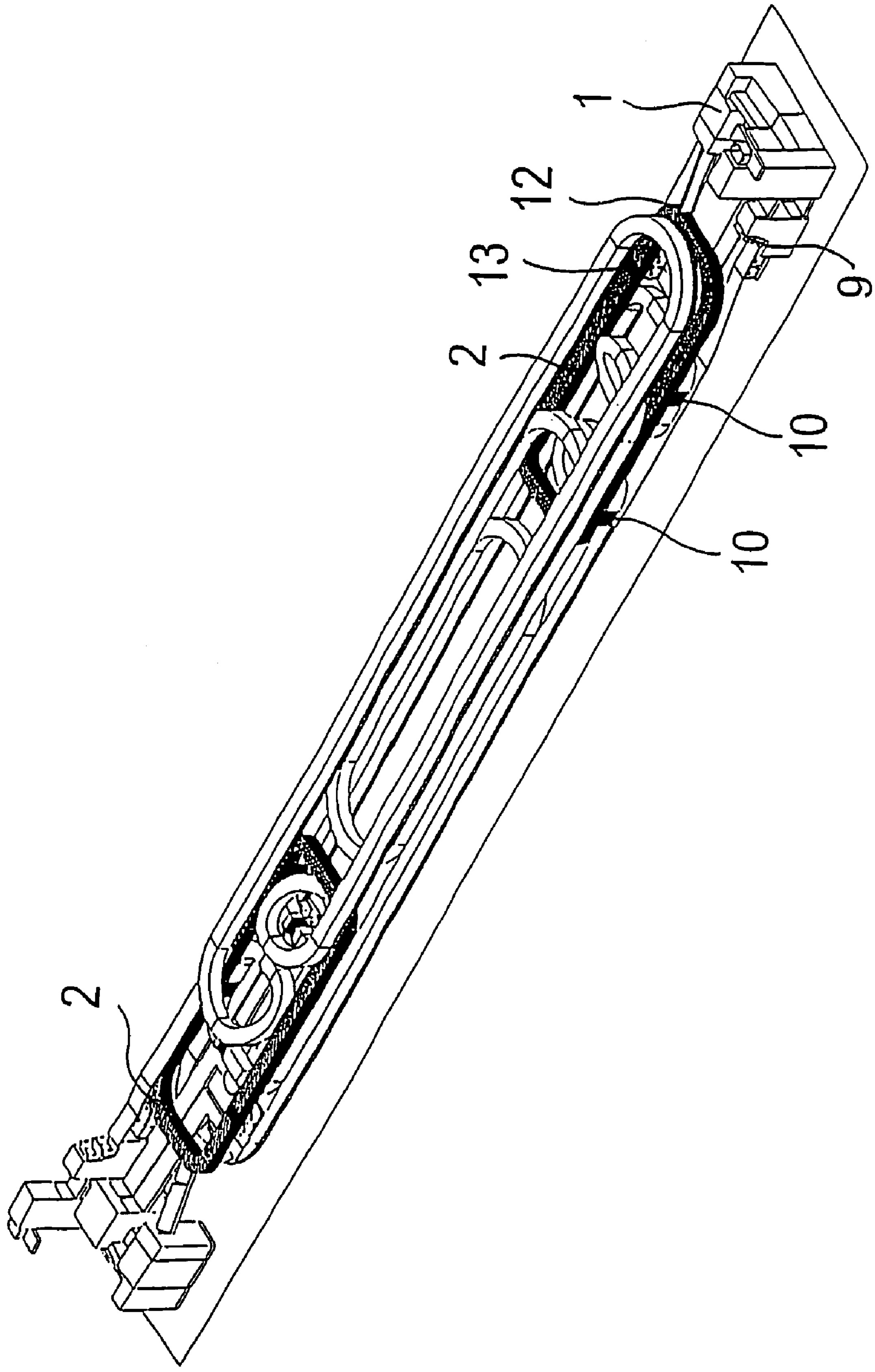
FIG. 6 is a perspective drawing of two nested organizing devices.

If a second individual organizing system B is rotated 180° about its vertical axis and the portion of the pocket ring 5 thereof not overlapping the collector belt 7 is folded in the opposite manner, the two systems A and B can be fitted together as shown in FIG. 6.

In this case, the additional plane of the pocket ring 5 is located above the plane of the buffer storage unit 2 in one system and, in the other system, it is located below the plane of the buffer storage unit 2. Only a small base area is therefore required.

The example shown here can naturally be modified by a person skilled in the art, depending on the specific conditions. If one separating unit does not, for example, have the required throughput, a plurality of separating units 1 can supply the buffer pockets 3 in parallel.

The invention claimed is:

1. A device for sorting flat mail items according to a predetermined sequence of delivery points associated with recipient addresses, comprising:

at least one separating unit, each having a downstream reader unit for identifying address information located on a mail item;

a first pocket ring configured to receive the mail items from each reader unit and having a plurality of pockets coupled to a circulating conveyor system, wherein an empty pocket is configured to receive a mail item for sorting the mail items, wherein the pockets are configured to be downwardly opened in a controlled manner, and wherein the first pocket ring circulates in a transport direction at a transport speed;

a buffer storage unit arranged between the reader units and the first pocket ring, wherein the buffer storage unit has circulating buffer pockets for receiving read mail items and for delivering the mail items in a controlled manner to empty pockets of the first pocket ring, wherein conveyor means of the buffer storage unit circulate in the same direction as the first pocket ring but at a different transport speed; and a carrying system having a collector belt and arranged below a continuous portion of the first pocket ring, wherein a portion of the carrying system overlaps with the continuous portion within an overlap area, wherein the portion of the carrying system travels at a relative speed to the continuous portion, wherein the collector belt is subdivided into sections for receiving the mail items from the pockets to transport the mail items in a transport direction to a stacking device, and wherein the collector belt moves at a transport speed, wherein the portion of the pocket ring extending beyond the overlap area and not located below the exit points of the buffer storage unit is guided in a plane located above a plane of the buffer storage unit or below a plane of the collector belt, the mail items circulating in the same direction in both planes wherein the transport speed and the transport direction of the collector belt are matched to the transport speed and transport direction of the first pocket ring such that, as each section of the collector belt travels along the overlap area, it passes each pocket of the first pocket ring at least once, and wherein the mail items are emptied out of the pockets of the first pocket ring onto the collector belt according to read recipient addresses such that the mail items leave the collector belt towards the stacking device in the predetermined sequence of the recipient addresses.

2. The device according to claim 1, further comprising a second pocket ring arranged between the first pocket ring and the carrying system, wherein the second pocket ring circulates at a second transport speed and in a second transport direction, at least one of which is different from the transport speed and transport direction of the first pocket ring, and wherein pockets of the second pocket ring are configured to receive mail items from the first pocket ring and to deliver them to the carrying system within the overlap area.

3. The device according to claim 2, wherein the first pocket ring and the collector belt circulate in opposite directions.

4. The device according to claim 2, further comprising devices for loading further mail items onto the sections assigned to the recipient addresses, wherein the devices for loading are arranged above portions of the collector belt disposed outside the overlap area.

5. The device according to claim 2, further comprising sensors configured to measure a thickness of the mail item, wherein the mail items are emptied into a section of the collector belt only up to a defined maximum overall height.

6. The device according to claim 2, wherein the collector belt is arranged in a U-shape below a portion of the first pocket ring.

7. The device according to claim 2, wherein the first pocket ring has, outside the overlap area, at least one unloading station for ejecting mail items from the pockets according to specified sorting criteria.

8. The device according to claim 2, further comprising a portioning unit between the collector belt and the stacking device, wherein the portioning unit is configured to bundle matching mail items for a particular delivery point prior to stacking.

9. The device according to claim 1, wherein the buffer pockets are configured to be connected to a circulating endless conveyor means and to be disconnected from the conveyor means.

10. The device according to claim 1, wherein the first pocket ring and the collector belt circulate in opposite directions.

11. The device according to claim 1, further comprising devices for loading further mail items onto the sections assigned to the recipient addresses, wherein the devices for loading are arranged above portions of the collector bolt disposed outside the overlap area.

12. The device according to claim 1, further comprising sensors configured to measure a thickness of the mail item, wherein the mail items are emptied into a section of the collector belt only up to a defined maximum overall height.

13. The device according to claim 1, wherein the collector belt is arranged in a U-shape below a portion of the first pocket ring.

14. The device according to claim 1, wherein the first pocket ring has, outside the overlap area, at least one unloading station for ejecting mail items from the pockets according to specified sorting criteria.

15. The device according to claim 1, wherein the buffer storage unit has, outside the overlap area, at least one unloading station for ejecting mail items from the buffer pockets according to specified sorting criteria.

16. The device according to claim 1, wherein a height-overcoming deflection of the first pocket ring is effected inside the buffer storage unit.

17. The device according to claim 1, further comprising a portioning unit between the collector belt and the stacking device, wherein the portioning unit is configured to bundle matching mail items for a particular delivery point prior to stacking.

* * * * *